United States Patent

Heydon et al.

[11] Patent Number: 6,145,056
[45] Date of Patent: Nov. 7, 2000

[54] METHOD AND APPARATUS FOR CACHING THE RESULTS OF FUNCTION APPLICATIONS WITH DYNAMIC, FINE-GRAINED DEPENDENCIES

[75] Inventors: Clark Allan Heydon, San Francisco; Roy Levin, Palo Alto, both of Calif.; Butler Lampson, Cambridge, Mass.

[73] Assignee: Compaq Computer Corporation, Houston, Tex.

[21] Appl. No.: 09/093,222

[22] Filed: Jun. 8, 1998

[51] Int. Cl.[7] .................................................. G06F 12/08
[52] U.S. Cl. .................................. 711/129; 717/1
[58] Field of Search ..................... 711/118, 129, 711/173; 395/701, 703, 705, 709; 707/3, 6; 717/1, 3, 5, 9

[56] References Cited

U.S. PATENT DOCUMENTS

| | | | |
|---|---|---|---|
| 5,500,881 | 3/1996 | Levin et al. | 395/700 |
| 5,748,961 | 5/1998 | Hanna et al. | 395/701 |
| 5,897,637 | 4/1999 | Guha | 707/101 |
| 5,940,619 | 8/1999 | Abadi et al. | 395/705 |
| 5,956,513 | 9/1999 | McLain, Jr. | 395/705 |

*Primary Examiner*—Do Hyun Yoo
*Assistant Examiner*—Gary J. Portka
*Attorney, Agent, or Firm*—Leah Sherry Oppenheimer Wolff & Donnelly

[57] ABSTRACT

Entries are cached in a function cache by statically assigning a primary key to each cache entry, and first grouping entries having identical primary keys, and dynamically assigning a secondary key to each cache entry, and then second grouping entries in each primary key group into sub-groups according to their secondary keys. The function cache is first accessed with a particular primary key to get the primary key group. Second, the primary key group is accessed with a particular secondary key to get a sub-group, and third, the sub-group is accessed with the same particular secondary key to get a matching cache entry.

26 Claims, 13 Drawing Sheets

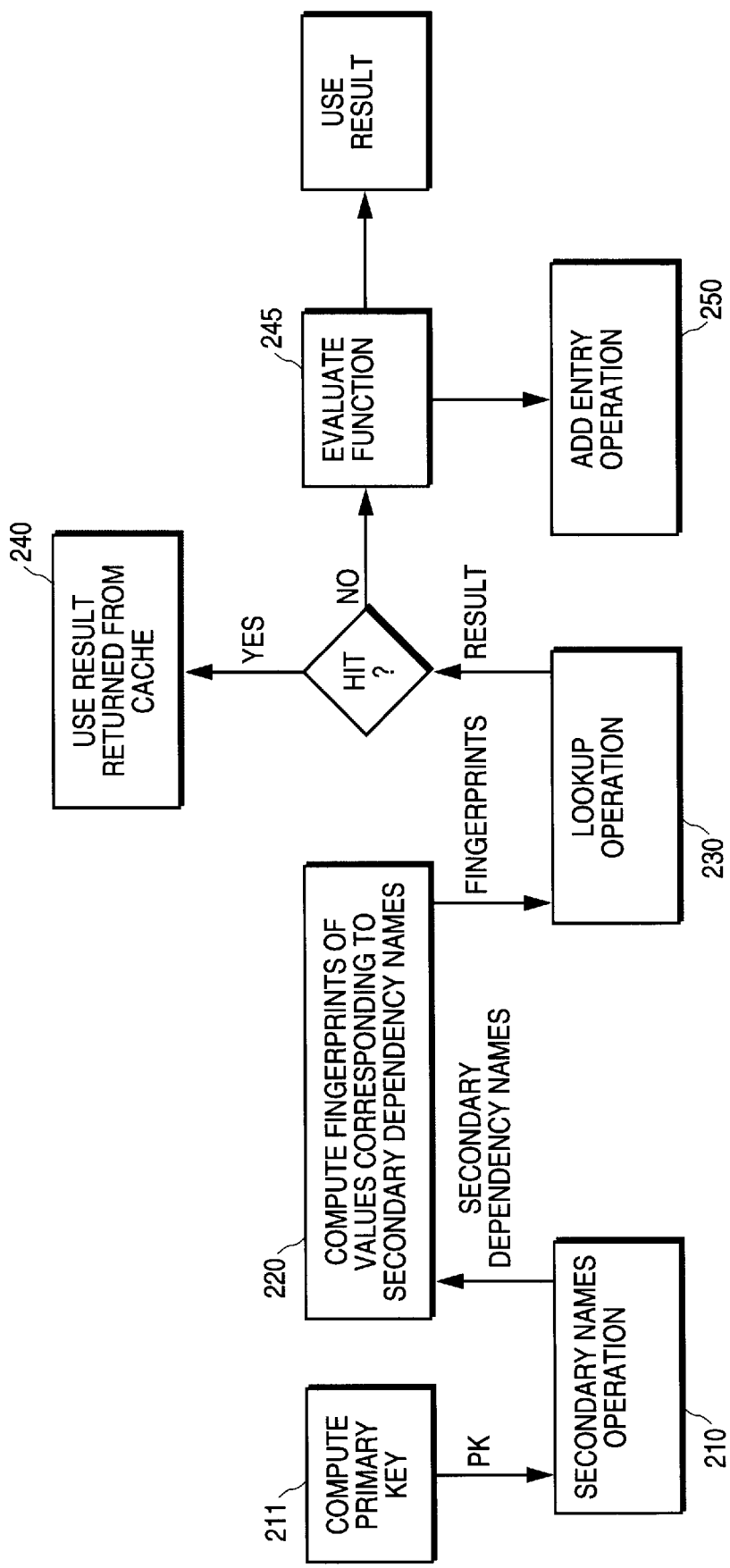
FIG.2 (AMENDED)

| SECONDARY DEPENDENCY NAMES | ENTRIES (PK) | | | | | |
|---|---|---|---|---|---|---|
| | 1 | 2 | 3 | 4 | 5 | X |
| ./ROOT/USR/LIB/CMPLRS/CK | A | A | A | A | A | A |
| ./ROOT/USR/INCLUDE/STDIO.H | B | B | B | B | | B |
| ./ROOT/WD/DEFS.H | | | F | G | G | G |
| ./ROOT/.WD/FOO.C | C | D | E | E | H | H |
| COMMON FINGERPRINT (CFP) | A+C | A+D | A+E | A+E | A+H | |

FIG. 4

METHOD AND APPARATUS FOR CACHING THE RESULTS OF FUNCTION APPLICATIONS WITH DYNAMIC, FINE-GRAINED DEPENDENCIES

FIELD OF THE INVENTION

This invention relates generally to memory caches, and more particularly to a function cache for storing results of function applications.

BACKGROUND OF THE INVENTION

In a software configuration management (SCM) system, users describe how to build software systems. The notation for such descriptions varies between SCM systems. In one notation used by the invention described below, the instructions take the form of a program written in a functional language. The program specifies how to build the software from scratch, that is, source files. In the functional program, invocations of external tools like compilers and linkers are written as function calls. Because the program specifies how to build the software from scratch, results from previous builds an be remembered and reused to achieve good incremental performance. Typically, the results are stored in a cache.

In a prior art SCM system, a function cache is also used. U.S. Pat. No. 5,500,881, "Language Scoping for Modular, Concise, Configuration Descriptions," issued to Levin et al on Mar. 19, 1996, see also "The Vesta Approach to Precise Configuration of Large Software," Levin et al, SRC Research Report 105, June, 1993, http://gatekeeper.dec.com/pub/DEC/SRC/-research-reports/abstracts/src-rr-105.html, "The Vesta Repository: A File System Extension for Software Development," Chiu et al., SRC Research Report 106, June, 1993, http://gatekeeper.dec.com/pub/DEC/-SRC/research-reports/abstracts/src-rr-106.html, "The Vesta Language for Configuration Management," Hanna et al., SRC Research Report 107, June, 1993, http://gatekeeper.dec.com/pub/DEC/SRC/research-reports/abstracts/src-rr-107.html, and "Bridges: Tools to Extend the Vesta Configuration Management System," Brown et al., SRC Research Report 108, June, 1993, http://gatekeeper.dec.com/pub/DEC/SRC/research-reports/abstracts/src-rr-108.html.

The primary operations performed by a function cache are AddEntry and Lookup. Entries, according to Vesta, are indexed by primary and secondary keys. AddEntry places results in the function cache, and Lookup retrieves entries (hits), or produces misses if there is no corresponding entry for the Lookup key.

The function cache in the prior art differs from what is disclosed below in two aspects. First, the function cache in the prior art only considers a subset of the existing cache entries. Hence, caching is not always completely accurate: it is possible to get a false miss on the cache. Second, the entries in the prior art cache are partitioned only into groups with the same primary key. Hence, the Lookup operation with that function cache has to consider every secondary dependency name of every cache entry in the relevant primary key (PK) group. These terms are described in greater detail below.

The ClearCASE product formerly of Atria Software Inc, now from Pure Software Inc, is another software configuration management system that caches builds, but apparently ClearCASE uses a slow, brute-force approach that requires comparing the versions of all the dependencies to all of a tool application's potential cache entries, "ClearCASE Concepts Manual," Atria Software, Inc., 1992.

Therefore, it is desired to provide an efficient function cache that stores dynamic, fine-grained dependencies.

SUMMARY OF THE INVENTION

Provided are a method and apparatus for caching results of function applications during a build of a large scale software system. As an advantage, a cache stores parts of the arguments on which a function result dynamically depends. Because a dependency may be on part of a composite argument, the dependencies are fine-grained. The invention solves the problem of efficiently looking up entries in a function cache that supports dynamic, fine-grained dependencies. The invention also supports caches that are larger than what can be stored in a dynamic random access memory.

The invention provides a method for caching entries in a function cache. The method statically assigns a primary key to each cache entry, and groups entries having identical primary keys. A secondary key is dynamically assigned to each cache entry, and sub-groups are formed for each primary key group according to their secondary keys.

In order to retrieve an entry, the function cache is first accessed with a particular primary key to get the primary key group. Secondly, the primary key group is accessed with a particular secondary key to get a sub-group, and the last sub-group is accessed with the particular secondary key to obtain a matching cache entry.

In one aspect of the invention, the secondary key associated with each entry is a set of name-value pairs, and for each primary key group, the function cache determines the set of common names shared by all secondary keys of entries in that group. The function cache also determines a common fingerprint for each cache entry. The common fingerprint of the entry is a combination of the values in the secondary key corresponding to the common names associated with the primary key group of the entry.

Furthermore, cache entries are divided into sub-groups within primary key groups according to their common fingerprints, and only values corresponding to common names in the secondary key are used when accessing the sub-groups of a primary key group. Values in the secondary key that do not correspond to common names are used when accessing the cache entry of a sub-group.

BRIEF DESCRIPTION OF THE DRAWINGS

FIG. 2 is a flow diagram of result caching according to the preferred embodiment;

FIG. 4 is a block diagram of example cache entries and their secondary dependencies;

DESCRIPTION OF PREFERRED EMBODIMENTS

General Context in Which the Invention Operates

We describe methods and data structures that can be used with a software configuration management (SCM) system to build large scale software systems. The data structures are stored in a function cache, and the methods operate on the data structures. By a function cache, we mean an entity, such as a memory, for storing results of parameterized and deterministic, that is functional, computations.

Figure 1:
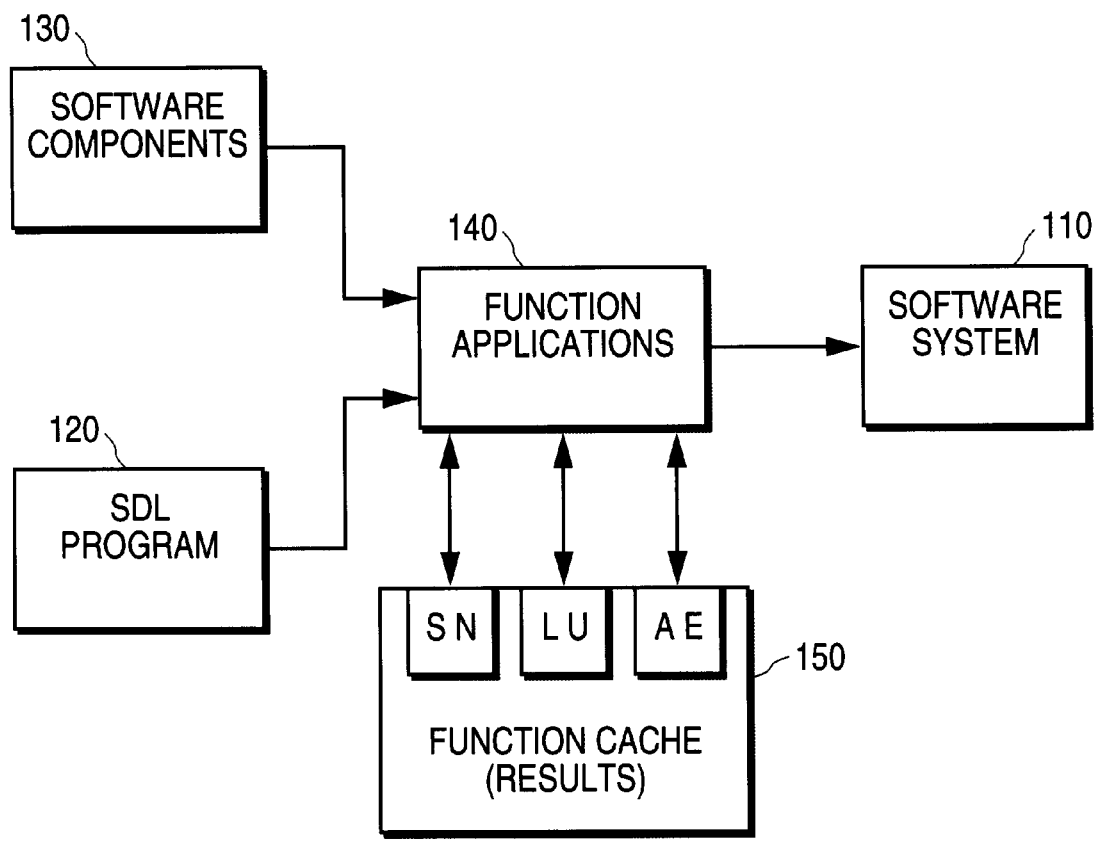
FIG. 1 is a block diagram of a function cache that stores dynamic, fine-grained dependencies according to the invention.

As shown in FIG. 1, a user describes how to build a software system 110 by writing a program 120 in, for example, a system description language (SDL), see Heydon et al., "The Vesta-2 System Description Language," SRC Technical Note 1997-005a, March, 1998, http://gatekeeper.dec.com/pub/DEC/SRC/technical-notes-/abstracts/src-tn-1997-005b.html.

The SDL program 120 identifies software components 130 that are to be used to build the software system 110. The user then invokes a compatible evaluator to interpret the program. The evaluator operates by invoking function applications 140. Interpretation of the program results in the desired software 110. As a side-effect of evaluating the program 120, the evaluator invokes standard system tools like compilers and linkers to build the desired software.

In order to achieve consistent software builds, the program 120 should describe how to build the software 110 from scratch. For good performance, however, parts of previous builds are remembered, or cached, by a memory component of the system called the function cache 150. By reusing parts of previous builds, builds become incremental. In the preferred embodiment, the function cache 150 is shared by all of the users at a particular site where the software is built. Consequently, all users at the site can benefit from each other's builds.

In the preferred embodiment, the SDL is a functional language. All computation in a functional language is expressed by function invocations. A function is a parameterized unit of work that, when invoked, returns a result that is deterministically computed from its arguments. Function calls provide a convenient unit of work for caching.

Whenever a function call is about to be evaluated for some particular arguments, the evaluator performs a lookup in the function cache to see whether that function has been evaluated on sufficiently similar arguments in the past. If so, the evaluator re-uses the result stored in the cache for that call. Otherwise, the function is evaluated to produce the result, and then the result and arguments are added to the function cache as a new cache entry.

The obvious way to organize the function cache is to group cache entries according to the function being invoked, with each cache entry associating a particular combination of arguments with the corresponding evaluation result. In such a cache structure, the time required to perform a lookup would be proportional to the number of entries associated with that function in the cache.

That would be a serious performance bottleneck when building large scale software because functions such as "compile" are expected to have anywhere from thousands to hundreds of thousands of entries associated with them in the cache. Described herein is a cache organization that substantially reduces the time required to perform a lookup operation, thereby leading to substantially better performance.

The present function cache 150 is different from a normal memory cache in two important respects. First, the entries stored in the cache are immutable, so the cache does not have to support invalidation, a considerable simplification.

Second, the cache key used to look up a cache entry is not directly determinable from the function call site. This property substantially complicates the design. The cache key is not directly determinable because dependencies are computed dynamically, as they are discovered. The function cache 150 also supports dependencies that are fine-grained, allowing better caching. The next section describes the need for dynamic, fine-grained dependencies.

Dynamic, Fine-Grained Dependencies

For good incremental software build performance, it is important to form cache entries based on dependencies that are both dynamically computed, and fine-grained. To illustrate the need for dynamically computed dependencies, we will use an artificial function and two example calls. It should be understood that a real function application can be quite complex, perhaps having hundreds of dynamic, fine-grained dependencies. The example function f1 is:

```
f1(x: int, y: int, z: int): int
{
    return if x > 0 then y else z;
}
```

This example function returns the argument y if x>0, or z otherwise. Consider the effect of evaluating the following two calls in sequence:

(1) f1(1, 2, 3); and (2) f1(1, 2, 4).

A naive caching policy would simply combine the identity of the function f1 with the values of its three arguments to form a single cache key. The problem with this approach is that it incorporates too much information into the cache key. With this policy, the above two function calls would have different cache keys because the value for the z argument is different for the two calls. Hence, the second call would not get a hit on the cache entry created for the first call.

However, the second call should get a hit on the entry created by the first call because during the dynamic execution of the function, the value of the z argument is irrelevant to the function's result so long as the first argument x is positive, which it is in both cases.

To produce better cache performance, our approach separates the cache key into two parts: the primary key and the secondary key. The primary key is formed from those aspects of the function call on which the function result is thought to depend at the time of the call, and the secondary key is formed from those parts of the call on which the function result may or may not depend, depending on the dynamic execution of the function. The evaluator can use a heuristic to determine on which parts of the function call the function is thought to depend, i.e., which parts of the function call are to be included in the primary key, and which parts in the secondary key.

In our example, the primary key is simply formed from the function f1 being called. The secondary key for the first call includes the dynamic dependencies on the arguments x and y. With our example, the secondary key for the first call is:

{x=1, y=2}.

On the second function call, the current values of the x and y arguments are compared to the secondary key. Because the keys match, the cache would report a hit on the entry added by the first call, returning the value of 2.

Note that these secondary dependencies are actually too strong because the function result only depends on x being positive, and not that it must equal 1. However, because the secondary dependency names are unstructured text, the cache interface is general enough so that secondary dependencies can be encoded as arbitrary predicates. Therefore, a calling program might use the dependency name "IsPositive (x)," with a dependency value of true or false.

The preferred evaluator uses a fixed set of six different dependency types. One dependency type that we have found to be quite important is a type that indicates that a file does not exist. Such dependencies are required to do correct caching.

Fine-grained dependencies are needed because the preferred SDL permits composite values. A composite value is a value like a C language "struct," or a Pascal language "record" that consists of one or more sub-parts. In our SDL, the composite values are lists, bindings, and closures. A list is a sequence of values, a binding is a sequence of (name, value) pairs, and a closure is a function paired with an evaluation context.

When a composite value is passed to a function, the best caching is achieved when dependencies are only recorded for those parts of the composite value on which the result of the function depends. To illustrate this point, consider the example function f2 in which the three arguments x, y and z above are instead passed to the function bundled up in a single binding argument b:

```
f2(b: binding): int
{
    return if b/x > 0 then b/y else b/z;
}
```

In this function, the notation b/n denotes the value associated with the name n in the binding b. Consider the following two calls:

(1) f2([x=1, y=2, z=3]); and (2) f2([x=1, y=2, z=4]).

In these calls, the notation [n1=v1, n2=v2, . . . , nK=vK ] denotes a binding value consisting of the specified (name, value) pairs. As for the example above, it would be undesirable to record a dependency on the entire binding value b, because then the second call would not get a hit on the cache entry produced by the first call.

Instead, we record fine-grained dependencies on only those parts of the composite (i.e., binding) value on which the function's result depends. In this case, we record the following fine-grained, dynamic secondary dependencies for the first call of f2 as: {b/x=1, b/y=2}. On the second call, the values for b/x and b/y will be found to agree with those of the first cache entry, so there will be a cache hit.

Fingerprints

The value associated with a name in the secondary key is an arbitrary SDL value, and so it can be quite large. It would take a lot of memory space to store such values, and a lot of time to compare a candidate value against the values stored in the cache on a lookup operation. Therefore, instead of storing actual values in the secondary key, we store fixed-sized checksums of the values called fingerprints. See Rabin, "Fingerprinting by Random Polynomials," Report RT-15-81, Department of Computer Science, Harvard University, 1981, and Broder et al., "Some Applications of Rabin's Fingerprinting Method," Sequences II: Methods in Communications, Security, and Computer Science pp. 143-152, Springer-Verlag, 1993.

A fingerprint is a special kind of fixed-length checksum that includes a probabilistic guarantee. The guarantee bounds the probability that two distinct bit sequences will have the same fingerprint. By making the fingerprint size large enough, the probability of a collision can be made vanishingly small. Thus a fingerprint of an arbitrary-length bit sequence is in effect a fixed-length unique identifier for that sequence. The preferred embodiment uses 128-bit fingerprints. Fingerprints have the advantage that they are small and can easily be combined without forfeiting their probabilistic guarantee.

Storing only the fingerprints of values contributing to the cache key is sufficient because the cache only combines such values and compares them for equality. Of course, the function cache stores result values in full, because the result values must be returned to the evaluator in response to a cache hit.

Function Cache Interface

We now describe the application programming interface (API) used with our function cache. In general, support of the function cache requires two types of operations: looking up an entry and adding a new entry. Both operations require a primary and secondary key. Because the function cache stores entries with dynamically-computed dependencies, the lookup operation is broken down into two phases, as shown in FIG. 2.

In the first phase, a primary key 211 is determined by the evaluator from the function call, and the primary key is operated on by a SecondaryNames operation 210. This operation returns a sequence of all secondary dependency names 212 mentioned in all cache entries with the supplied primary key.

SecondaryNames(pk: Fingerprint): Sequence[Text]

In the second phase, the fingerprints of the sequence of secondary names are used to determine (step 220) current fingerprints of the values from the current evaluation environment. A Lookup operation 230 that has as arguments the sequence of current fingerprints is then performed.

Lookup(pk: Fingerprint, new_fps: Sequence [Fingerprint]):

{Hit, Miss} X CacheIndex X Sequence[Byte]

The fingerprints passed to Lookup are in the same order as the sequence of names 212 returned by the SecondaryNames operation. In the event of a cache hit, the index of the cache entry and the result value of a previous similar function application are also returned (step 240). The cache index is a small positive integer that identifies the cache entry, and the result value is a sequence of bytes.

If the Lookup operation misses in the cache, the function is evaluated 245 in the current evaluation environment. The result of the evaluation is added to the cache as a new entry by invoking an AddEntry operation 250. The AddEntry operation 250 takes as input arguments the primary key, the secondary dependency names, the fingerprints of their corresponding values, and the result value of the function evaluation represented as a sequence of bytes, and returns the index of the newly created cache entry:

AddEntry(pk: Fingerprint, add_names: Sequence[Text],
    add_fps: Sequence[Fingerprint], result_value:
    Sequence[Byte]): CacheIndex The add_names and add_fps sequences have the same length. We sometimes describe the secondary dependencies as being passed as a sequence of (name, fingerprint) pairs, but they are actually passed to the cache as two separate sequences.

Overview of the Preferred Embodiment

Cache lookups are restricted to entries with a particular primary key (PK). Hence, both in memory and on disk, cache entries are grouped by primary key. The groups of cache entries in memory with the same primary key are called PK groups. The main idea of our invention is to group cache entries with the same primary key into sub-groups.

The invention guarantees that on a lookup request, only the entries in at most one sub-group need be considered. Hence, the number of entries that must be considered is greatly reduced, leading to better performance. Moreover, as will be described below, the number of fingerprint comparisons required for each entry considered in the appropriate sub-group is also greatly reduced, leading to additional performance gains.

The sub-groups are formed as follows. For any given primary key pk, let entries(pk) denote the set of all entries stored in the cache for pk. For any given cache entry ent, let names(ent) denote the set of secondary dependency names associated with entry ent. These are the cache entry's secondary dependency names, or names for short. We define:

$$common\_names(pk) = \bigcap_{ent \in entries(pk)} names(ent)$$

$$all\_names(pk) = \bigcup_{ent \in entries(pk)} names(ent)$$

That is, common_names(pk) is the set of names common to all entries with primary key pk, and all_names(pk) is the set of all names occurring in entries with primary key pk.

In practice, the set of common names is a large subset of the set of names in each cache entry. Considerable processing time can be saved by forming a single fingerprint from the values associated with the common names in each entry. This idea is the basis for creating sub-groups. The sub-groups are formed by combining the fingerprints associated with the names in common_names(pk) for each entry, yielding a common fingerprint for each entry. Entries with the same common fingerprint value are stored together in the same sub-group.

More formally, let fp(ent, nm) denote the fingerprint of the value associated with name nm in entry ent, where nm ∈ names(ent). Assume for the rest of this discussion that ent ∈ entries(pk). Then the common fingerprint cfp of the entry ent with primary key pk is given by:

$$cfp(pk, ent) = \text{combine}_{nm \in common\_names(pk)} fp(ent, nm).$$

The fingerprints are combined in a canonical order as described below. The common fingerprint is well-defined for each entry ent ∈ entries(pk) because, by definition of common_names(pk), we have:

ent ∈ entries(pk) Y (nm ∈ common_names(pk) Y nm ∈ names(ent)).

Figure 3:
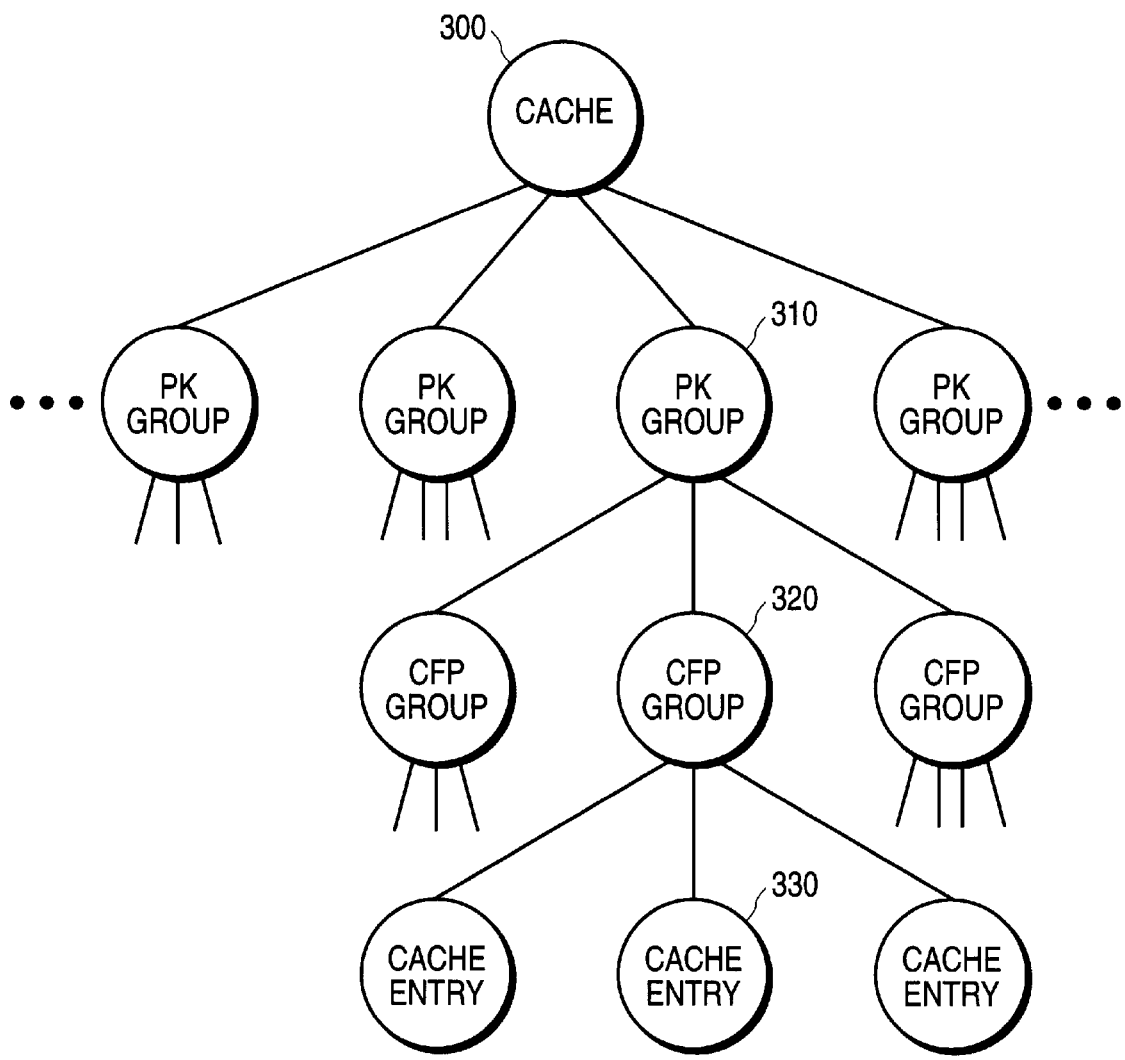
FIG. 3 is a block diagram of multi-level cached entries.

As shown in FIG. 3, the cache entries 330 are thus grouped in a three-level hierarchy. First, the top-level cache 300 is divided by primary key into primary key (PK) groups 310. Within each primary-key group, the entries are divided by their common fingerprint values into common fingerprint (CFP) groups 320. On a lookup request, the combined fingerprint of common_names(pk) is computed. If there is a CFP group for that combined fingerprint, then only the entries in that sub-group are considered for a match; otherwise, a cache miss is reported.

Our invention yields two savings. First, only the entries in the appropriate CFP group need be consulted for a potential cache hit. In practice, this yields a tremendous speed-up. Many PK groups have lots of CFP groups, with each CFP group having a small number of entries. Hence, only a small number of entries need usually be considered instead of tens or hundreds. Second, once the appropriate CFP group has been located, only the fingerprints of the names not in the set common_names(pk) need be considered. Again, this tends to yield substantial savings in practice because most entries have very few uncommon names. In fact, many entries have no uncommon names, i.e., all of their names are common.

Notice that adding or deleting entries in a given PK group can cause its set of common names to change. Adding an entry can cause common_names(pk) to get smaller, while deleting an entry can cause it to get larger. Whenever common_names(pk) changes, the CFP of each entry must be recomputed. This operation can drastically change the CFP groups within a PK group, and it is quite an expensive computation.

Hence, we do not update common_names(pk) each time a new entry is added or an existing entry is deleted. Instead, we amortize the cost of recomputing the common fingerprints by delaying that computation until a large enough number of new entries have been added, or until a group of entries needs to be deleted. This requires that new entries be stored separately from existing entries in each PK group until such time as the new entries are incorporated into the CFP groups and common_names(pk) is updated.

The idea of splitting a group into sub-groups based on the group's common names can be generalized further. Within each CFP group 320, we can also form sub-groups based on the names that are common names within the CFP group. This yields a cache data structure with four levels instead of three. The same idea could then be applied recursively to yield an arbitrary number of levels. As another variant, the idea of splitting a group into sub-groups could also be applied selectively whenever a group was deemed to have too many entries. However, we have found for our applications that three levels are sufficient, so we partition the entries into a three-level hierarchy using PK groups and CFP sub-groups within PK groups.

EXAMPLE

To make the above concepts and notation more concrete, FIG. 4 illustrates a simple example 400. This example shows five cache entries 410 associated with a function for compiling a source file named foo.c. A value pk denotes the primary key for the compilation function. Shown are secondary dependency names 421–424 and fingerprints of their associated values 430 for the five entries in entries(pk) 420. In FIG. 4, there is one column for each cache entry in entries(pk), and the capital letters (ABCDEFG) 430 denote different fingerprint values. A fingerprint letter appears in the row for the name nm and the column for entry ent if and only if nm ∈ names(ent).

Because the dependencies are computed dynamically, different entries 410 depend on different sets of names 420. All of the entries 410 depend on the compiler cc 421 (whose fingerprint is A), and all entries depend on the source file foo.c 424; however, four different versions of the source file foo.c 424 (with fingerprints C, D, E, and H) have been seen by the cache, and each entry may depend on other files. Entries 1–4, for example, also depend on the header file stdio.h 422.

Now imagine that the entries were added to the function cache in left-to-right order. The second entry was added because the file foo.c had changed: its fingerprint changed from C to D. The third entry was added because foo.c was changed again to E, but in this case, a part of the change was to include an additional dependency on the header file defs.h (F). Entry 4 was added not because foo.c changed (still E), but because defs.h changed from F to G. Finally, entry 5 was added because foo.c was changed again to H, and this time, the dependency on stdio.h was removed.

Notice that a cache entry like the one marked X cannot occur due to the existence of cache entry 5. The two entries are identical except that entry X has the additional name stdio.h as one of its secondary dependencies. However, because the cache entries correspond to applications of deterministic functions, it is impossible for the same function to have two different executions where the secondary dependencies (treated as name-value pairs) of one execution are a strict subset of the secondary dependencies of the other. If both entry 5 and entry X were to exist in the cache simultaneously, then it would be possible for a Lookup operation to get a hit on either entry, thus making the cache non-deterministic.

In this example the common names are:

common_names(pk)={./root/usr/lib/cmplrs/cc,./root/.WD/foo.c}.

The line labeled CFP 440 denotes the result of combining the fingerprints corresponding to these common names for each entry 410. For example, the CFP for entries 3 and 4 is the combination of the fingerprints A and C, denoted A+C 441. In this example, there are four different CFP values for five total entries.

Figure 5:
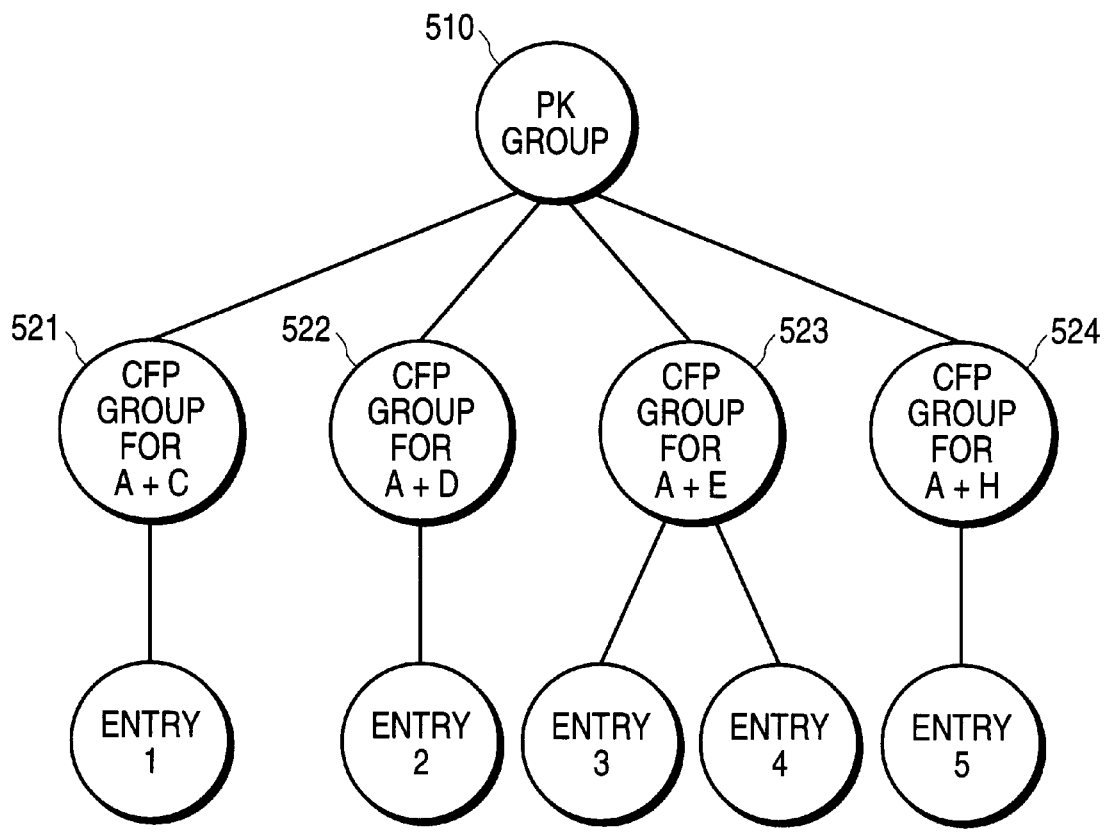
FIG. 5 is a block diagram of entries in a primary key group.

FIG. 5 shows how the entries of FIG. 4 would be organized in the corresponding PK group. There is one primary key group 510, and four sub-groups 521–524, one for each common fingerprint value.

We can store the set of common names for each primary key with the associated PK group. An entry's combined fingerprint of those common names is stored indirectly with the CFP group with which the entry is associated. For each entry, we need only store a record of the entry's uncommon names and the combined fingerprint of those uncommon names.

Details According to the Invention

The above description and examples gloss over many details important to the invention. These are now described.

New versus Old Entries

Figure 6:
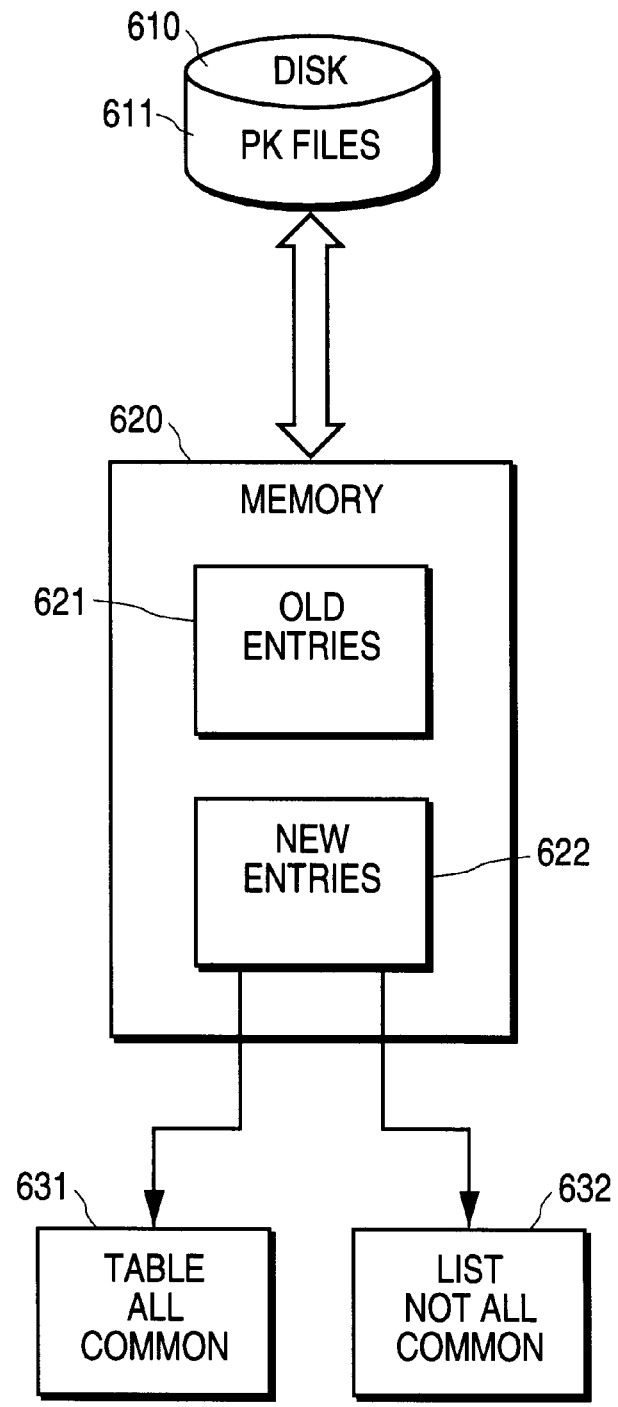
FIG. 6 is a block diagram of memories and data structures used by the invention.

Our function cache is designed to store far more cache entries than can be stored simultaneously in dynamic random access memory, for example many millions of entries. Therefore as shown in FIG. 6, most cache entries are stored in files on a disk 610. The entries are grouped by PK, and stored in files called PKFiles 611. In the event of a cache hit, the matching old entry stored on the disk 610 is loaded into a table of old entries 621 in the memory 620. In the event of a miss, the function is evaluated and a new entry 622 for it is also stored in the memory 620. Periodically, the new entries 622 are flushed out to the disk. Hereinafter, an entry that is brought into the memory from the disk is called an old entry, and an entry which has yet to be flushed to disk is called a new entry.

As stated above, adding or deleting a new entry in a PK group can change common_names(pk). It is very expensive to change common_names(pk), because it requires recomputing the CFP of each cache entry, and hence, reorganizing the cache entries into potentially different CFP groups.

The invention amortizes this cost over a group of entries by updating common_names(pk) only when a group of new entries are flushed to disk, or when a group of entries must be deleted from the PKFile. The acts of flushing new entries to disk and deleting existing entries are performed by the same update operation.

For each PK group, the cache stores the old and new entries separately. Two types of new entries are defined. Those that have all of the names in common_names(pk), and those that do not. It is worth keeping these two kinds of new entries separated because we can compute a CFP for those new entries that have all of the common names. Hence, we can store new entries with all of the common names in a table 631 indexed by CFP, and lookups on those entries can therefore be performed faster. New entries without all of the common names must be stored in a single list 632. On a lookup, both the table 631 of new entries indexed by CFP, and the list 632 of new entries are considered.

Data Structures

At a top level, the cache stores a table pktbl that maps primary keys (PK's) to PK groups, and a bit vector usedCIs that represents the set of cache indices currently in use. The ith bit of the usedCI's bit vector is set if and only if there is a cache entry in the cache, either in memory or on disk, with index i.

Figure 7:
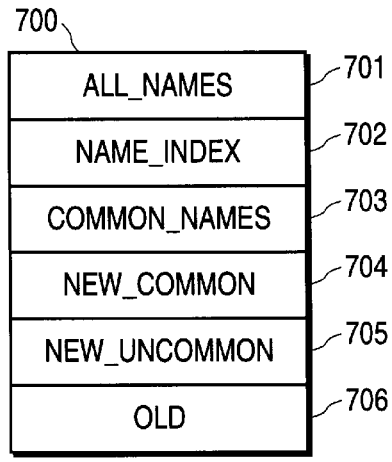
FIG. 7 is a block diagram of elements of a primary key group.

As shown in FIG. 7, each PK group 700 stores the following elements: all_names, name_index, common_names, new_common, and old 701–706. The all_names field 701 is a sequence of secondary dependency names corresponding to all_names(pk), and the name_index field 702 is a table mapping names in all_names to their order in the sequence. If we use all_names[i] to denote the ith name in the sequence, where the first name has index 0, then name_index 702 is maintained so that name_index(all_names[i])=i for all i in the half-open interval [0, NUMBER (all_names)). The common_names field 703 is a bit vector interpreted relative to the sequence all_names. That is, bit i of common_names is set if and only if the name all_names[i] is common for this PK group. Generally, the common_names field represents the set common_names (pk). However, as stated above, we do not update the set of common names each time a new entry is added. Hence, common_names is the intersection of names taken over only the old entries (both on disk and in memory); new entries are ignored.

New entries are of two types, and therefore are stored in either the new_common table 704 or the new_uncommon list 705. If a new entry has all of the names in common_names, then the entry is stored in new_common. Otherwise, the new entry is stored in new_uncommon. The field old 706 is a table of old entries. The new_common table 704 and the old table 706 map CFP values to lists of cache entries. The cache entries in each list all have the same PK and CFP.

Figure 8:
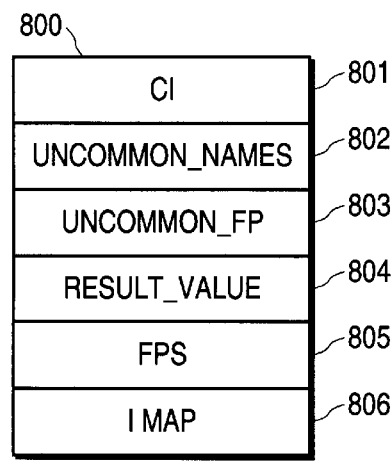
FIG. 8 is a block diagram of a cache entry.

As shown in FIG. 8, each cache entry 800 in one of the PK groups 700 or PKFiles 611 has the following fields, ci, uncommon_names, uncommon_fp, result_value, fps, and imap 801–806. The field ci 801 is the index of the entry. The uncommon_names field 802 is a bit vector of this entry's uncommon names. Like the common_names bit vector stored in the PK group, the uncommon_names field 802 is interpreted relative to the PK group's all_names sequence. That is, bit i of uncommon_names 802 is set if and only if the name all_names[i] is an uncommon name for this cache entry. The uncommon_fp field 803 is a single fingerprint that results from combining the fingerprints of the entry's uncommon secondary dependency values.

Because the Combine operation on fingerprints is not commutative, the order in which the fingerprints are combined is important. Fingerprints are combined in the order in which the corresponding names appear in the all_names sequence.

The result_value field 804 stores the functional result value supplied by the evaluator during the AddEntry operation. The function cache knows nothing about the structure of the result value; it is simply a sequence of bytes.

The fps 805 and imap 806 fields are not required for lookups on old entries. However, they are needed to do lookups on new entries and to recompute the entry's CFP and uncommon_fp values during the Update operation. Therefore, these fields are stored only with new entries and with old entries on disk. The fps field 805 contains the fingerprints of the entry's secondary dependencies.

The fingerprints are stored in the order in which they were generated during the AddEntry operation. The imap field 806 stores the name index map. This field is necessary because the evaluator is allowed to supply the secondary dependency (name, fingerprint) pairs to the AddEntry operation in an arbitrary order. This order may be completely different from the order that was used on a previous AddEntry operation, even for the same primary key. The PK group's all_names field stores the definitive ordering of names for each PK. The imap field 806 maps indices in the all_names sequence to indices of the corresponding (name, fingerprint) pairs as they were supplied for the particular entry created by the AddEntry operation. The name index map is described further below.

The imap field 806 is used in the preferred embodiment of the invention, but there is another way to handle the arbitrary order in which names are delivered by the AddEntry operation that would not require the imap field. Instead, the (name, fingerprint) pairs could be sorted by the AddEntry operation so that the order of the names in the cache entry agrees with those in the PK group's all_names sequence. However, this would require sorting the names at AddEntry time, a relatively costly operation. The two implementations represent a time/space tradeoff: using the imap requires more space, but avoids the costly sorting operation at AddEntry time required by the other approach. The next section describes the need for and use of the imap field in greater detail. The methods described below are all based on the variant that uses the imap.

The Name Index Map

When the AddEntry operation is invoked to generate a new cache entry, the evaluator supplies a sequence of (name, fingerprint) pairs for the entry's secondary dependencies. These pairs may be supplied in any order. However, the secondary dependency names stored in the new entry's PK group may be stored in a different order. For example, suppose a particular PK group's secondary dependency names consists of the following sequence:

all_names[0]=./root/usr/lib/cmplrs/cc
all_names[1]=./root/usr/include/stdio.h
all_names[2]=./root/.WD/foo.c.

Suppose that a cache AddEntry operation is invoked with the following (name, fingerprint) pairs:

pair[0]=(./root/.WD/foo.c, FP1)
pair[1]=(./root/.WD/defs.h, FP2)
pair[2]=(./root/usr/lib/cmplrs/cc, FP3)

Here, the names are in a different order, one of the existing names is missing (stdio.h), and there is a new name (defs.h).

To map between the names the AddEntry operation receives and the names already stored in the cache, an association is made between the names. The association maps the index in the all_names sequence to the index of the corresponding pair. In this case, the cache would first have to append the new name (defs.h) to the PK group's all_names sequence:

all_names[3]=./root/.WD/defs.h, and then form imap as follows:

imap(0)→2
imap(2)→0
imap(3)→1.

Notice that the imap is a partial function. For example, in this case, there is no association with the value 1 since the name stdio.h is not a secondary dependency of this entry. Also notice that the range of the map is a permutation of the set {0, 1, . . . , n−1}, where n is the number of secondary dependencies supplied for the new entry. The names in the pairs do not need to be stored with the entry because all of a PK group's names are stored in the all_names sequence. The pair's fingerprints do need to be stored however. They are stored in order in the entry's fps field.

When determining an entry's uncommon_fp 803, the function cache iterates over the set bits of the uncommon_names bit vector. Each set bit in that bit vector corresponds to one of the entry's uncommon names. The fingerprint corresponding to name i is given by fps[imap(i)]. It is common for an entry's imap to be the identity. To save space, the present invention uses a null pointer instead of the identity map in that case; however, this step is not essential to the preferred embodiment.

SecondaryNames Operation

As described above, a cache lookup is done in two phases: a call of SecondaryNames followed by a call of Lookup. To perform the SecondaryNames operation, the function cache must locate or create the PK group G associated with the supplied primary key, as described in Method A below. The SecondaryNames operation then returns the sequence of G.all_names.

A. Locating or Creating the PK Group for a Given Primary Key

Figure 9:
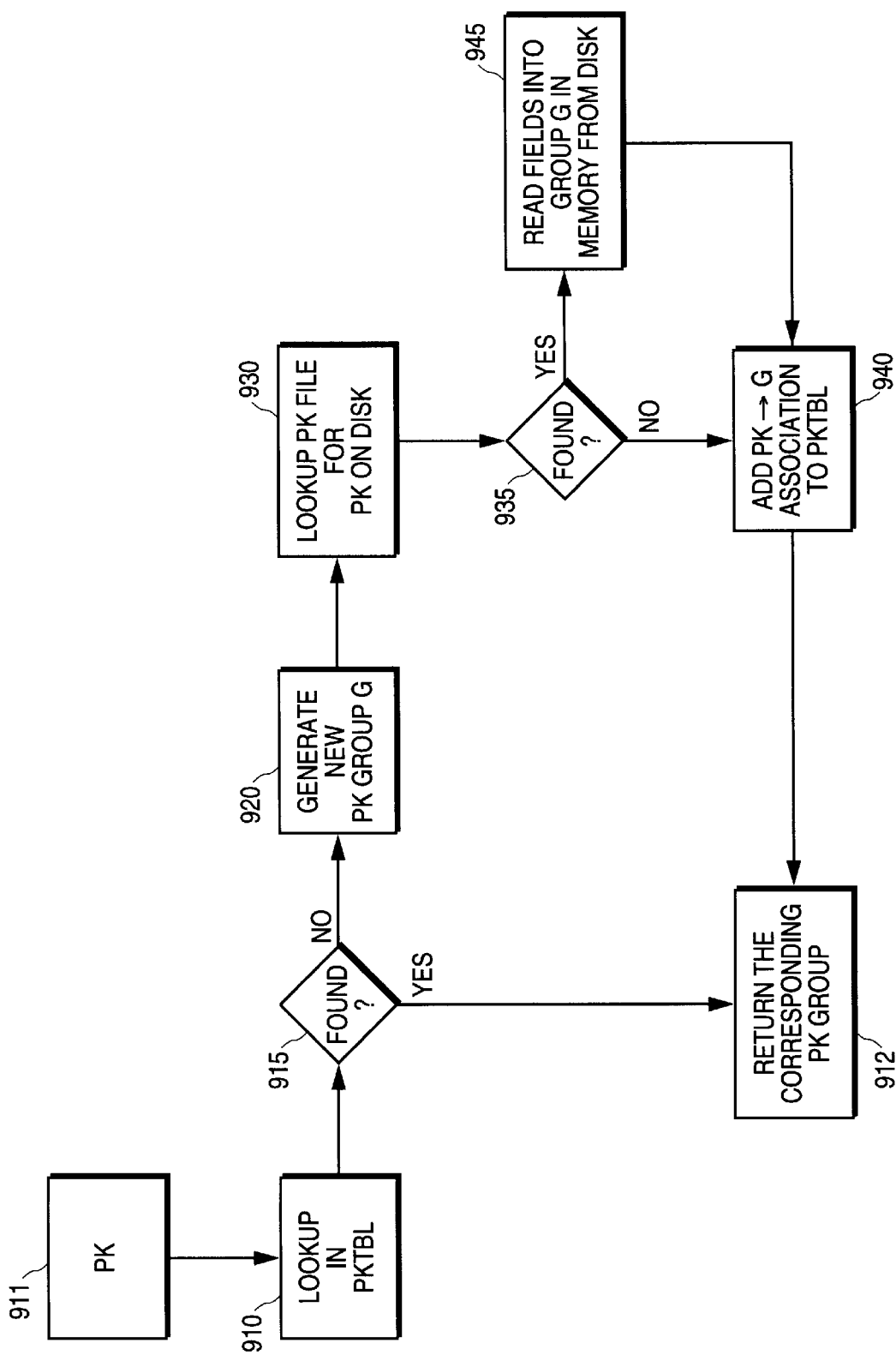
FIG. 9 is a flow diagram of a method for looking up a primary key group.

As shown in FIG. 9, a primary key pk 911 is supplied. In step 910, pk 911 is looked up in the cache's central pkTbl table. If found 915, the corresponding PK group is returned 912. If pk 911 is not in the pkTbl, then in step 920 generate a new PK group G all of whose fields are empty. We write G.f to denote the field f of the PK group G. In step 930, look for a PKFile on disk corresponding to pk; if such a PKFile exists 935, its all_names, name_index, and common_names values are read from disk into the corresponding fields of G in memory 945. In step 940, the association pk G is added to the central pkTbl table, and G is returned 912.

Lookup Operation

The cache's Lookup operation is supplied with a PK and a sequence new_fps of fingerprints whose length is the same as that of the corresponding PK group's all_names sequence. There is actually the possibility for a race condition here when another evaluation has added a new entry with new names since the call to SecondaryNames. The race condition can be handled with standard optimistic concurrency control techniques.

Figure 10:
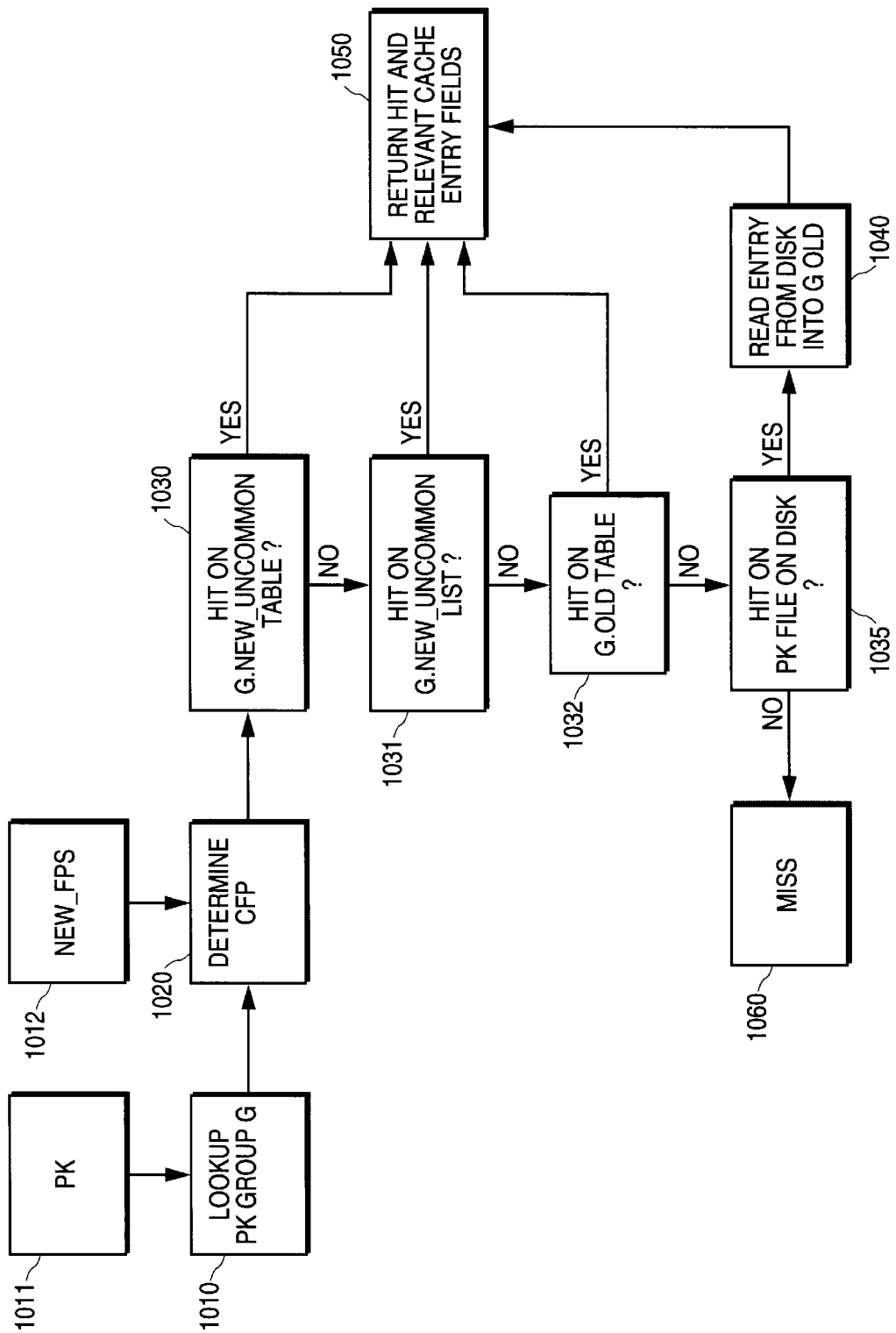
FIG. 10 is a flow diagram of the top-level steps for looking up cache entries.

FIG. 10 shows the top level steps of the Lookup method. In step 1010, lookup the PK group G corresponding to the supplied primary key pk 1011 in the cache's central pkTbl table. The PK group will exist in the table because one was generated, if necessary, by the preceding SecondaryNames operation. In step 1020, determine the CFP for the supplied fingerprint sequence new_fps 1012 using the G.common_ names bit vector; see Method B below. In step 1030 look for a cache hit successively in the following places:

a. in the G.new_common table (see Method C below),
 b. in the G.new_uncommon list (see Method D below),
 c. in the G.old table (see Method C below), or
 d. in the corresponding PKFile on disk (see Method C below).

If a hit is found in cases (a), (b), or (c) 1030–1032, then proceed with step 1050; subsequent cases are not performed and the algorithm proceeds directly to step 1050. If a hit is found in case (d) 1035, then read the corresponding cache entry from disk into memory in step 1040, and add the entry to the CFP group in G.old indexed by the CFP computed in step 1020 above. If a hit is found, then return the triple<Hit, ci, result_value>in step 1050, where ci and result_value are the like-named fields in the corresponding cache entry. Otherwise, if there was no hit, return Miss 1060.

B. Method for Determining a Combined Fingerprint

Figure 11:
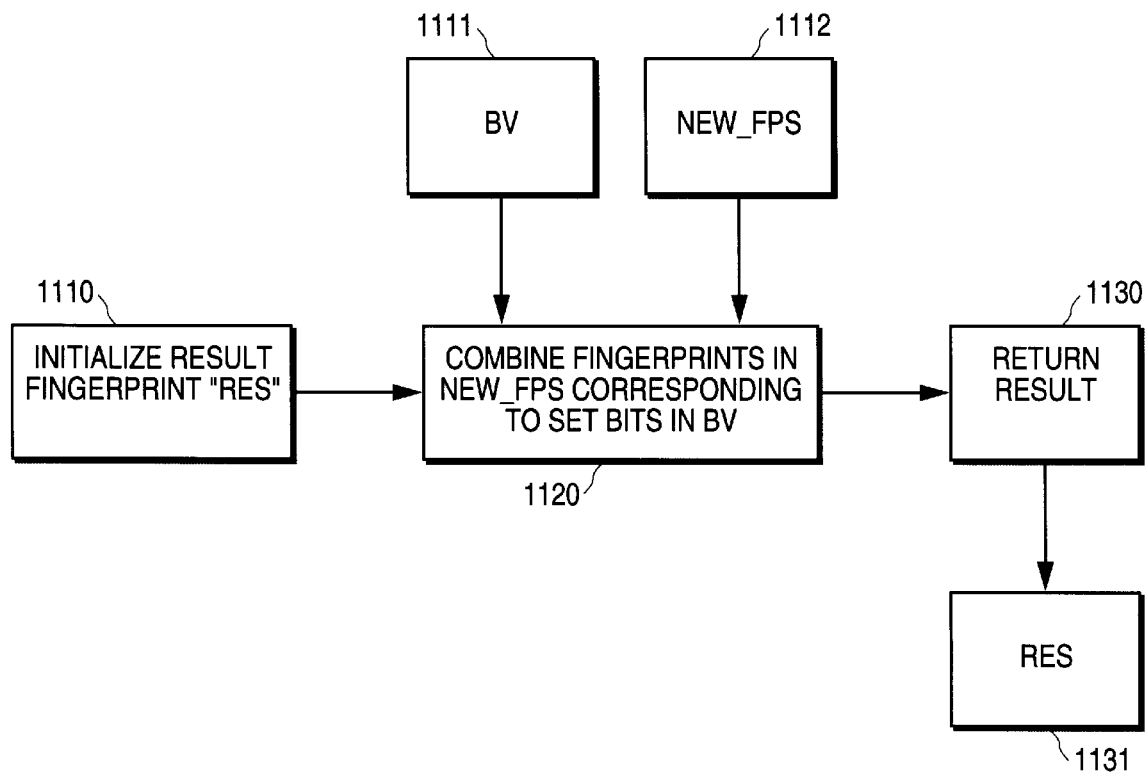
FIG. 11 is a flow diagram of a method for combining fingerprints.

A combined fingerprint is determined relative to a bit vector bv 1111 and a sequence of fingerprints new_fps 1112 by the steps shown in FIG. 11. Initialize the result fingerprint res to the fingerprint of the empty byte sequence in step 1110. Consider each of the set bits in bv in increasing order in step 1120. For each set bit, do res←Combine(res, new_fps[i]), where i is the index of the set bit on each iteration. Return the result fingerprint res 1131 in step 1130.

C. Method for Looking Up Common Fingerprint

Figure 12:
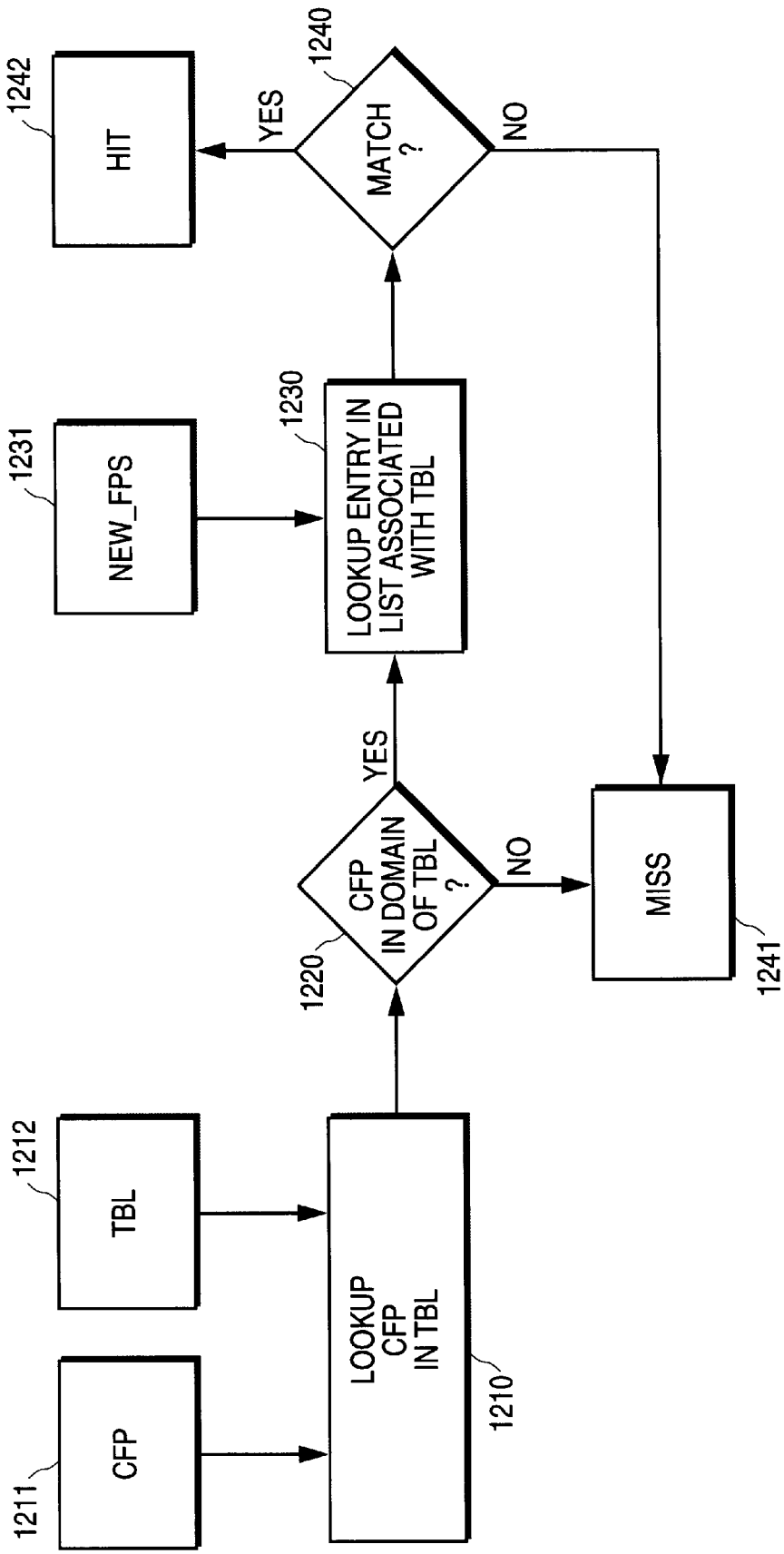
FIG. 12 is flow diagram for looking up a common name.

FIG. 12 shows the steps of a method for looking up an entry with fingerprints new_fps 1231 in a CFP table tbl 1212 (which will be either a PK Group's new_common or old table), given its common fingerprint cfp 1211. In step 1210 lookup the given cfp 1211 in the table 1212. If the given cfp is not in the domain of the table 1220, return a miss in step 1241. Otherwise, the cfp maps to a list of cache entries. For each cache entry in the list, check for a hit in step 1230 using Method D below. If there is a match 1240, return a hit in step 1242; otherwise, return a miss in step 1241.

D. Method for Looking Up an Entry in a List of Cache Entries.

Figure 13:
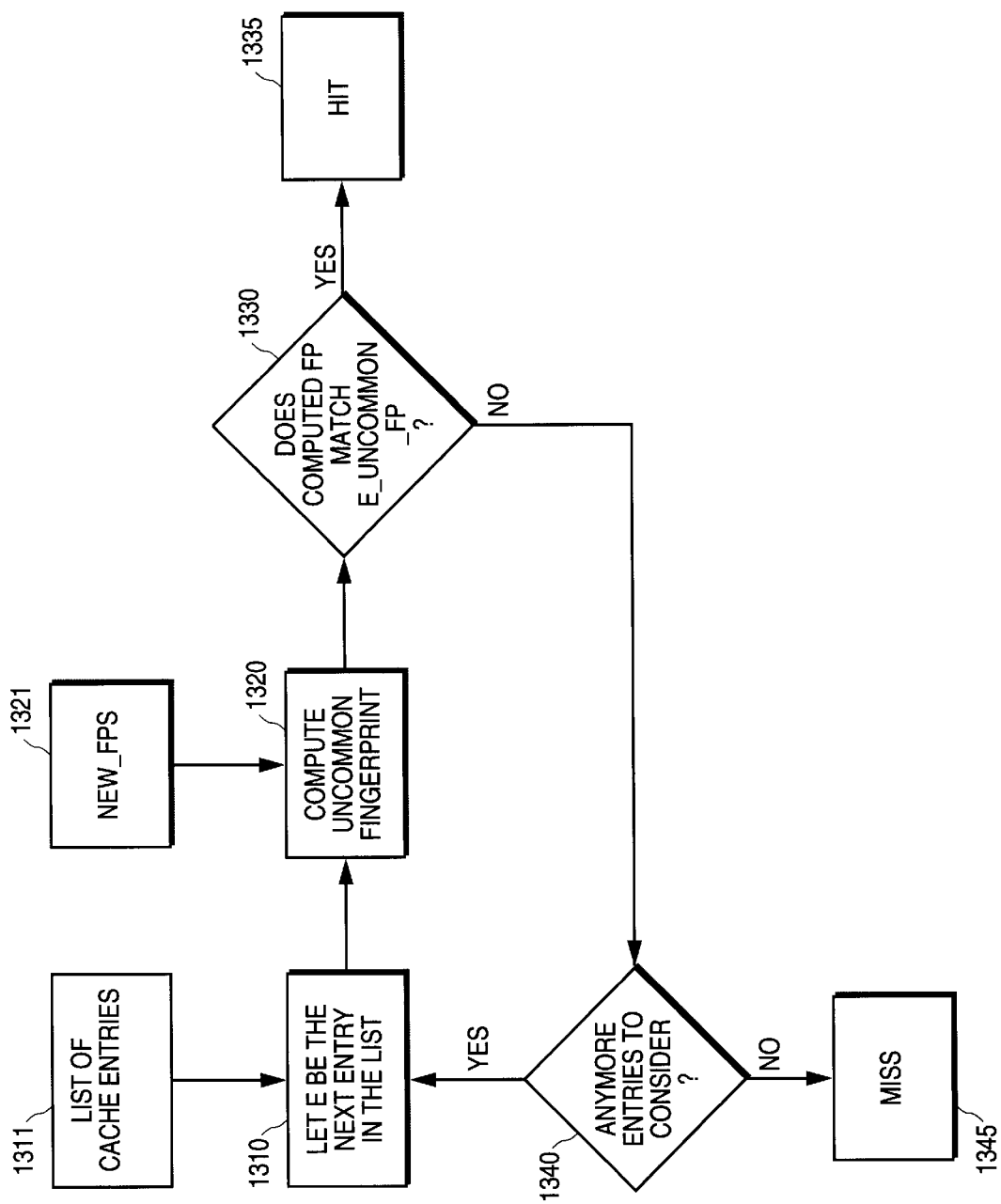
FIG. 13 is a flow diagram of a method for comparing uncommon names.

FIG. 13 shows the steps of the method D. Given a list of cache entries 1311, check for a hit using the following steps. In step 1310, let e be the next entry in the list. In step 1320, compute an uncommon fingerprint based on the entry's uncommon_names bit vector and the supplied fingerprints new_fps 1321. This is done using Method B above. In step 1330 compare the computed uncommon fingerprint to e.uncommon_fp. If they are identical, then there is a hit 1335. Otherwise, in step 1340 see if there are any more entries in the list 1311. If so, return to step 1310. Otherwise, there is a miss 1345.

Optimizing Lookup Using XOR Tags

This section describes an optimization technique that can be used. The optimization is not essential to the working of the invention. The Lookup method just described assumes that the uncommon_fp values of entries in the cache have already been computed. It also requires that the combination of the appropriate new_fps fingerprints be determined for each cache entry considered. However, it is somewhat expensive to combine a sequence of fingerprints.

Therefore, to improve lookup performance, the following technique can be used. Rather than combining fingerprints using the expensive fingerprint Combine operation, fingerprints are combined using a simpler function based on the logical exclusive-OR (XOR) operation. The XOR function does not preserve the probabilistic uniqueness guarantee the way the fingerprint Combine operation does. In particular, the XOR function can produce a false positive, but not a false negative.

Therefore, a test based on XOR is used first. If the test fails, then we know there is no chance for a hit. If the test succeeds, then we still have to use the expensive fingerprint combining operation to test for a true hit. Therefore, an extra uncommon_xor field is stored for each cache entry. The uncommon_xor field stores the result of combining the uncommon names using the XOR function.

In all of the steps above where the combined uncommon fingerprint is determined, we instead first determine the combined uncommon XOR of the new_fps, and compare the result to the entry's uncommon_xor field. Only when those match do we determine the combined fingerprint of the new_fps fingerprints as described above.

This optimization also implies that we can determine the uncommon_fp field of each cache entry lazily. When a new entry is added to the cache, we need only determine its uncommon_xor field. We defer computation of the entry's uncommon_fp field until it is needed. This saves us from having to determine the combined uncommon_fp field when the entry is generated. An extra bit is required per cache entry to remember if the entry's uncommon_fp field has been unlazied, (i.e., determined), or not.

Determining the uncommon_fp field requires that the entry's imap and fps fields are available. As described previously, these are only available for new cache entries. Hence, when a new cache entry is flushed to disk, its uncommon_fp field must be unlazied so it will be available when the (then old) entry is read into memory.

In the rest, we do not described the XOR improvement, although this improvement is used by the invention.

AddEntry Operation

The AddEntry operation is passed as input a primary key pk, a sequence add_names of names, a sequence add_fps of fingerprints, and a result_value. The method for adding a new entry to the cache works as follows.

Step 1. Look up the PK group G corresponding to pk using Algorithm A above.

Step 2. Let ci be the index of an unset bit in the central usedCIs bit vector, and set the bit. The present invention always chooses the unset bit in usedCIs with smallest index.

Step 3. Generate a new cache entry e. Initialize e.ci to the ci chosen in step 2, e.result_value to the result_value supplied to the AddEntry operation, and e.fps to the add_fps sequence supplied to the AddEntry operation. All other fields of e are initialized to empty (or default) values.

Step 4. Let names_bv be an empty bit vector.

Step 5. For each index i in the half-open interval: [0, NUMBER(add_names)), follow these steps:

Step 5a. Test if the name add_names[i] is present in G.name_index. If so, then let j be the index to which the name is mapped. If not, follow these steps:
 Step 5ai. Append the name add_names[i] to the G.all_names sequence, and let j be the index of the appended name in that sequence.
 Step 5aii. Add the association add_names[i]→j to the G.name_index map.
 Step 5b. Set bit j in the names_bv bit vector.
 Step 5c. Add the association j→i to the e.imap table.

Step 6. If all of the bits set in the G.common_names bit vector are also set in names_bv, goto step 10.

Step 7. Assign names_bv to e.uncommon_names.

Step 8. Add e to the G.new_uncommon list.

Step 9. Goto step 13.

Step 10. Set the e.uncommon_names bit vector to the set difference names_bv minus G.common_names. That is, a bit is set in e.uncommon_names if and only if it is set in names_bv but not in G.common_names.

Step 11. Let cfp denote the combined fingerprint resulting from applying algorithm E below to e with respect to the G.common_names bit vector.

Step 12. Add e to the list to which cfp is mapped by the G.new_common table. If cfp is not in the domain of G.new_common, associate cfp in G.new_common with a one-element list containing e.

Step 13. Initialize e.uncommon_fp to the combined fingerprint resulting from applying Algorithm E below with respect to the e.uncommon_names bit vector.

Step 14. Return the cache index e.ci.

E. Method for Determining a Combined Fingerprint

This method determines a combined fingerprint for a cache entry e relative to a bit vector bv.

Step 1. Initialize the result fingerprint res to the fingerprint of the empty byte sequence.

Step 2. Consider each of the set bits in bv in increasing order. For each set bit, do res←Combine (res, e.fps [e.imap (i)]), where i is the index of the set bit on each iteration.

Step 3. Return the result fingerprint res.

Update Method

Cache entries are deleted and new cache entries are flushed to disk by the function cache's Update operation:

Update(pk: Fingerprint, toDelete: BitVector)

This operation flushes any new cache entries in the PK group for primary key pk to disk. The operation also deletes cache entries from the PK group and the corresponding PKFile on disk whose indices correspond to set bits in the toDelete bit vector.

The update operation works by first reading all of the cache entries in the PKFile corresponding to pk into memory. It then updates the PK group's all_names, name_index, and common_names fields. Finally, it redetermines the common fingerprint for each cache entry, and updates each entry's uncommon_names, uncommon_fp, and imap fields. If any cache entries are deleted from the PK group, some names may have to be deleted from its all_names set. The remaining names are shuffled so as to eliminate "gaps" in the all_names sequence. The shuffling is represented by a temporary shuffle map from integers to integers.

Step 1. Initialize ents to an empty list of cache entries.

Step 2. Let G be the PK group corresponding to primary key pk in the central pkTbl table.

Step 3. Add all cache entries in G.new_uncommon to ents. Delete all entries from G.new_uncommon.

Step 4. Add all cache entries in G.new_common to ents. As each entry e is added, set e.uncommon_names to the bitwise OR of e.uncommon_names and G.common_names. Delete all entries from G.new_common.

Step 5. Read all of the cache entries in the PKFile on disk corresponding to primary key pk into memory, adding them to ents. The fps and imap fields of each entry must be read in as well. As in step 4, as each entry e is added, set e.uncommon_names to the bitwise OR of e.uncommon_names and G.common_names. Delete all entries from G.old.

Step 6. Remove from ents any cache entry whose ci field corresponds to the index of a set bit in the toDelete bit vector. Reset the corresponding bits in the cache's usedCIs bit vector. The present invention actually filters out the entries to be deleted by doing a test in steps 3, 4, and 5 above before adding each entry to the ents list, but that description is slightly more complicated.

Step 7. If ents is the empty list, then there are no more cache entries in the PK group corresponding to pk. Delete the corresponding PKFile from disk, remove the PK group from the cache's central pkTbl table, and exit the Update operation.

Step 8. Otherwise, initialize both G.common_names and a temporary bit vector all_names_bv to the uncommon_names bit vector of the first cache entry in ents.

Step 9. For the second and subsequent entries e in ents, do:

Step 9a. Set all_names_bv to the bitwise OR of all_names_bv and e.uncommon_names.

Step 9b. Set G.common_names to the bitwise AND of G.common_names and e.uncommon_names. At the end of Step 9, all_names_bv is the union of the names in all of the entries, and G.common_names is the intersection of those names.

Step 10. Any gaps in all_names_bv correspond to names that are no longer used by the remaining entries. The present invention removes these names by packing the remaining names down to fill the gaps, preserving their order. However, any other shuffling that rearranges the remaining names so as to remove the gaps could be used.

Step 10a. Pack down the names in G.all_names corresponding to set bits in all_names_bv so as to remove gaps, preserving the order of the names. Remove any names from G.all_names that are no longer used.

Step 10b. Redetermine the G.name_index table. That is, for each name in G.all_names, add the association all_names[i]→i to G.name_index.

Step 10c. Let shuffle be the map from integers to integers that maps the indices of bits in all_names_bv to the new indices of the corresponding names after they have been packed down by step 10a.

At this point, an example might be helpful. Assume that the original G.all_names sequence is:

all_names[0]=name0, all_names[1]=name1, all_names[2]=name2, all_names[3]=name3, all_names[4]=name4, and all_names[5]=name5.

Suppose that in Step 9 above the bit vector all_names_bv is determined to be the bit vector with the following bits: all_names_bv={1, 3, 4}. Then the G.all_names sequence would be packed down to include only the names originally at positions 1, 3, and 4:

all_names[0]=name1, all_names[1]=name3, all_names[2]=name4.

The G.name_index map would be determined in Step 10b as:

G.name_index={name1→0, name3→1, name4→2}.

The shuffle map would be determined in Step 10c to show the mapping from the original positions of these names to their new positions, namely:

shuffle={1→0, 3→1, 4→2}.

Step 11. Pack the G.common_names bit vector according to the map shuffle using Method F below.

Step 12. For each entry e in ents, perform the following steps:

Step 12a. Pack e.uncommon_names according to the map shuffle using Method F below.

Step 12b. Subtract out from e.uncommon_names the bits G.common_names. This is a set difference operation.

Step 12c. Update e.imap according to the map shuffle using Method G below.

Step 12d. Determine e.uncommon_fp from the e.uncommon_names bit vector using Method E above.

Step 12e. Compute a common fingerprint (CFP) for e from the G.common_names bit vector using algorithm E above.

Step 13. Write out a new PKFile for primary key pk containing the entries in ents. The entries are organized into CFP groups on disk according to the common fingerprints determined for them in step 12e above.

Step 14. Any entries in ents may also selectively be added to G.old to get faster hits on those entries on future Lookup operations. The current invention supports several such policies. The default policy is not to add any entries to G.old, but the cache may also be configured to save into G.old any entries that were in G.new_common, G.new_uncommon, or G.old at the start of the Update operation that were not deleted. Which policy to use is a time-space trade-off: saving more entries in G.old requires more memory, but it can reduce the cost of a hit on such entries on future Lookup operations.

F. Method for Packing a Bit Vector

Figure 14:
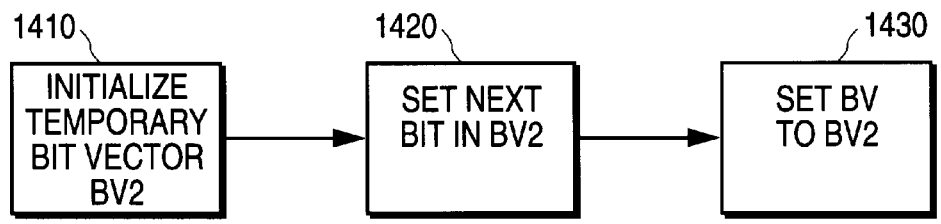
FIG. 14 is a flow diagram of a method for packing a bit vector.

FIG. 14 illustrates the steps of a method for packing a bit vector bv according to a packing map shuffle are as follows. Initialize the temporary bit vector bv2 to be empty. Let i range over the indices of the bits in bv. For each such index, set the bit with index shuffle(i) in bv2. Then, set bv to bv2, discarding the original bv.

G. Method for Updating a Name Index Map

Figure 15:
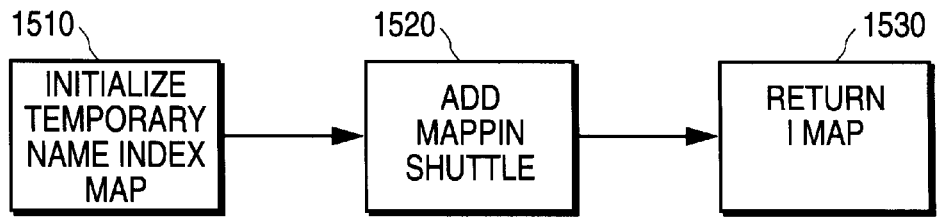
FIG. 15 is a flow diagram of steps for updating a name index map.

FIG. 15 illustrates the steps for updating a name index map imap according to a packing map shuffle are as follows. Initialize the temporary name index map imap2 to be empty. For each mapping i→j in imap, add the mapping shuffle(i)→j to imap2. Set imap to imap2, discarding the original imap.

The above description of the Update operation is quite brute-force. The actual preferred method avoids steps where possible. For example, one common case is that the toDelete bit vector is empty. In that case, many steps can be avoided, since no names will be deleted from G.all_names. Like all of the methods described herein, the description also ignores synchronization issues that must be dealt with in a multi-threaded implementation. For example, a lock on the PK group may be required to take a snapshot of the initial PK group during steps 3 and 4, and to update the PK group in step 14 of the Update operation.

Summary

The invention describes a function cache that supports dynamic, fine-grained dependencies and the deletion of existing cache entries. Moreover, the function cache's secondary dependency names take the form of arbitrary strings, so clients can encode arbitrary predicates in the secondary dependencies.

The invention solves the problem of doing fast lookup operations on such a function cache by sub-dividing the cache entries for each primary key into sub-groups. Only the entries in the relevant sub-group need be consulted on a lookup. Moreover, only the combined fingerprint of each entry's uncommon names need be consulted. In the typical case where most, if not all of each cache entry's names are common, this results in a substantial performance improvement. As noted above, the idea of dividing a group into sub-groups based on the common names of the entries in the group can be applied selectively and recursively. In practice, we have not found either of these enhancements necessary.

To avoid costly recomputations that would be required by a naive implementation whenever a new cache entry is added, the invention stores new entries for each primary key in side lists and tables. The work of flushing new cache entries to disk, of deleting existing entries, and of updating the data structures may then be done asynchronously, and that work may be amortized over several cache entry additions and deletions.

The whole point of present function cache is to improve the performance of software construction. Some form of incremental construction is an absolute necessity, but it is also important for that incremental construction to be accurate and timely. Because the present function cache is centralized, more accurate results can be obtained, with dramatically better performance.

It is understood that the above-described embodiments are simply illustrative of the principles of the invention. Various other modifications and changes may be made by those skilled in the art which will embody the principles of the invention and fall within the spirit and scope thereof.

We claim:

1. A computer implemented caching method, comprising:

providing a function cache in which cache entries are stored, each cache entry corresponding to a function implementation and a result of the function implementation;

statically assigning a primary key to each cache entry;

distributing the cache entries to primary key groups by grouping cache entries having identical primary keys;

dynamically assigning a secondary key to each cache entry, each secondary key corresponding to dynamic, fine-grained dependencies on which the result of the corresponding function implementation depends;

partitioning into sub-groups each of the primary key groups by grouping their respective cache entries according to their assigned secondary keys;

accessing the function cache to get to the primary key group associated with a particular primary key;

accessing the primary key group associated with the particular primary key to get to a sub-group associated with a particular secondary key; and accessing the sub-group associated with the particular secondary key to get to a cache entry matching the particular secondary key.

2. The caching method of claim 1 wherein the secondary key assigned to each cache entry is a set of name-value pairs.

3. The caching method of claim 1 further comprising determining, for each primary key group, a set of common names shared by secondary keys of cache entries in that primary key group.

4. The caching method of claim 1 further comprising determining a common fingerprint for each cache entry.

5. The caching method of claim 1 further comprising determining, for each primary key group, a set of common names shared by secondary keys of cache entries in that primary key group; and determining a common fingerprint for each cache entry from its respective secondary key, wherein the common fingerprint is a combination of values in the secondary key corresponding to the set of common names in the secondary key of the cache entry.

6. The caching method of claim 1 wherein each secondary key corresponds to a common fingerprint such that the cache entries are grouped into the sub-groups of the primary key groups according to their respective common fingerprints.

7. The caching method of claim 1 wherein each secondary key is a set of name-value pairs there being a set of common names shared by secondary keys within each respective primary key group, and wherein only values within the set of name-value pairs that correspond to the set of common names are used when accessing the sub-groups of the respective primary key group.

8. The caching method of claim 1 wherein each secondary key is a set of name-value pairs there being a set of common names shared by secondary keys within each respective primary key group, and wherein only values within the set of name-value pairs that do not correspond to the set of common names are used when accessing the cache entry of the respective primary key group sub-group.

9. The caching method of claim 1 wherein each primary key is formed from aspects of a respective function implementation on which a result of the function implementation depends.

10. The caching method of claim 1 wherein the result of any function implementation is deterministically derived from arguments provided in a respective function implementation invocation.

11. The caching method of claim 1 wherein the dynamic, fine-grained dependencies are associated with composite argument values provided in invocations of the corresponding function implementation such that the caching is optimized when the dynamic, fine-grained dependencies are recorded for those parts of the composite argument values on which the result of the corresponding function implementation depends.

12. The caching method of claim 1 wherein the dynamic, fine-grained dependencies are associated with composite argument values provided in an invocation of the corresponding function implementation, and wherein fingerprints of the composite argument values, instead of the composite argument values themselves, are stored in the secondary keys.

13. The caching method of claim 1 further comprising
a lookup operation that determines, for a particular function implementation invocation, whether a matching cache entry already exists; and
an add-entry operation that, upon a cache miss for the particular function implementation invocation, adds a corresponding cache entry to be stored in the function cache.

14. The caching method of claim 1 further comprising
accumulating new cache entries in a table of new entries;
periodically flushing out to a disk the accumulated new cache entries;
storing the flushed out new cache entries in files on the disk, there being a file for each primary key group that is stored in the disk; and
bringing from the disk into a memory old cache entries.

15. The caching method of claim 1 wherein the function cache has a hierarchical structure in which the entire function cache occupies a top level, the caching method further comprising structuring the function cache to include the primary key groups, their sub-groups and the cache entries in each of the sub-groups, respectively at first, second and third levels below the top level.

16. The caching method of claim 1 wherein the sub-groups are common fingerprint groups determined according to the secondary keys of the cache entries within each primary group.

17. The caching method of claim 1 wherein the sub-groups are common fingerprint groups determined according to the secondary keys of the cache entries within each primary group, and wherein the function cache has a hierarchical structure, the caching method further comprising structuring the function cache to include a top level for the entire function cache, a level for the primary key groups within the function cache and a level for the sub-groups within the primary key groups, the sub-groups level including the common fingerprint groups within the primary key groups, a level for common-name groups within the common fingerprint groups, and a level for the cache entries in each of the common name groups.

18. An apparatus for caching entries in a function cache, the entries being accessed by a program during an evaluation of functions, comprising:
a memory storing a data structure accessed by the program, the data structure including entries each having a statically assigned primary key and a dynamically assigned secondary key, the entries being grouped in respective primary key groups associated with identical primary keys, the entries within each primary key group being further grouped in sub-groups according to their respective secondary keys;
first means for accessing the function cache with a particular primary key to get to the primary key group associated with the particular primary key;
second means for accessing the primary key group with a particular secondary key to get the sub-group associated with the particular secondary key; and
third means for accessing the sub-group with the same particular secondary key to get a matching entry.

19. A caching apparatus, comprising:
a computer readable medium embodying a software configuration management program code configured to cause a computer system to build a software system;
an evaluator that interprets the software configuration management program code by invoking and evaluating function applications, each evaluated function application returning a result;
a function cache for storing cache entries, each result corresponding to one of the cache entries, the function cache being organized to include
a top level for the function cache in its entirety, and
levels below the top level, one of the levels being for primary key groups in which entries have a similar primary key, a second of the levels being for sub-groups of the primary key groups, a third of the levels being for the cache entries within the sub-groups, each of the primary key groups being divided into the sub-groups based on a secondary key, and when the sub-groups are common fingerprint groups determined according to the secondary keys of their respective cache entries the second of the levels is for the common fingerprint groups within the primary key groups, in which case the third of the levels is for common-name groups within the common fingerprint groups, and, a fourth of the cache levels is for the cache entries within the common name groups.

20. The caching apparatus of claim 19, in which the results are derived from parameterized and deterministic evaluations invoked as function calls.

21. The caching apparatus of claim 19 wherein the software configuration management program code is written in a system description language (SDL) which is a functional language.

22. The caching apparatus of claim 21 wherein the SDL is a Vesta-2 SDL.

23. The caching apparatus of claim 19 further comprising an application programming interface supporting a lookup operation to determine whether a cache entry matching a particular function application is present in the function cache, wherein the function cache organization narrows a particular lookup to cache entries in a particular one of the sub-groups within a particular one of the primary key groups; and an add entry operation adding new cache entries when no cache entry matching the particular function application is found in the function cache.

24. The caching apparatus of claim 19 further comprising a disk;

a new entries table in which new cache entries are accumulated and from which the accumulated new cache entries are flushed to the disk and stored in files; and an old entries table into which old cache entries are brought from the disk.

25. The caching apparatus of claim 19 wherein the secondary key associated with each cache entry is a set of name-value pairs, common names is a subset of names from the set, a fingerprint being formed from values within the set that are associated with the common names so that cache entries with a common fingerprint value are grouped in the same one of the common fingerprint groups.

26. The caching apparatus of claim 19 further comprising a primary key table that maps the primary keys to the primary key groups; and a bit vector that represents a set of function cache indices currently in use.

* * * * *